United States Patent Office 3,530,189
Patented Sept. 22, 1970

3,530,189
PROCESS FOR THE PREPARATION OF 4'-NITRO-4-ACETYL- OR 4-CHLOROACETYL-DIPHENYL
Eduard Moergeli, Muttenz, Switzerland, assignor to Ciba Limited, Basel, Switzerland, a company of Switzerland
No Drawing. Filed Dec. 28, 1965, Ser. No. 517,133
Claims priority, application Switzerland, Jan. 8, 1965, 258/65
Int. Cl. C07c 49/76, 49/80
U.S. Cl. 260—592          7 Claims

ABSTRACT OF THE DISCLOSURE

A process for the preparation of 4'-nitro-4-acetyl- or 4-chloroacetyl-diphenyl which comprises acylating diphenyl with acetyl chloride or chloroacetyl chloride in the presence of aluminum chloride, nitrating the acylated product in the same reaction medium with concentrated nitric acid in the presence of aluminum chloride and hydrolyzing the mixture.

---

4'-Nitrodiphenyl-4-carboxylic acid is an important dyestuff intermediate, because the azodiphenyldicarboxylic acid obtained therefrom by reduction gives valuable vat dyestuffs with aminoanthraquinones. Despite its great industrial importance there has hitherto not existed a technically satisfactory method of preparation of 4'-nitrodiphenyl-4-carboxylic acid. According to the method hitherto known as, for example, described in FIAT report 1313 vol. I, p. 213, and in PB report 74030, pp. 859–96, 4'-nitrodiphenyl-4-carboxylic acid is prepared by an involved three-stage process from diphenyl. The first stage, namely the nitration of diphenyl, has to be carried out whilst taking great precautions, in such a way that the 4-nitrodiphenyl can still be satisfactorily separated from the isomer mixture obtained by recrystallization from alcohol. The yield of nitrodiphenyl in this is at most about 50% of theoretical value. The process is also rendered even more difficult by the necessity for observing particular precautionary measures which are required in view of the carcinogenic properties of 4-nitrodiphenyl (see Houben-Weyl: Methods of Organic Chemistry, 4th edition, vol. I/2, p. 938). The second stage, the reaction of 4-nitrodiphenyl with acetyl chloride in the presence of aluminium chloride in nitrobenzene demands a very long reaction time and yields 4'-nitro-4-acetyldiphenyl in a yield of about 90% of the theoretical value. In the third stage, the 4'-nitro-4-acetyldiphenyl is converted to 4'-nitrodiphenyl-4-carboxylic acid, with a yield of about 70%, by treatment with aqueous sodium hypochlorite solution. Thus, starting from diphenyl, one obtains 4'-nitrodiphenyl-4-carboxylic acid in a yield of about 35%, a particular disadvantage being the fact that the intermediate products have in each case to be isolated, with losses occurring.

The present invention is based on the observation that 4'-nitrodiphenyl-4-carboxylic acid is obtained in a particularly favourable manner by acylating the diphenyl, in the presence of anhydrous aluminium chloride, by means of a halide of acetic acid or a halogen acetic acid in nitrobenzene, nitrating the aluminium chloride complex so obtained with concentrated nitric acid in the same reaction medium, in the presence of free aluminium chloride, mixing the reaction mixture wtih water in order to decompose the aluminium chloride complex, removing the aluminium salts and converting the nitro-4-acetyldiphenyl or nitro-4-halogenacetyldiphenyl into the 4'-nitro-diphenyl-4-carboxylic acid by a method known per se.

The first stage of the present method, namely the acetylation of the diphenyl, takes place in a known manner (c.f. for example BIOS Final Report No. 1153, p. 63) in nitrobenzene in the presence of aluminium chloride. As the acetyl halide one preferably uses acetyl chloride, that is to say approximately 1 mol per 1 mol of the diphenyl. Because of its high vapour pressure the acetyl chloride is preferably added as a solution in nitrobenzene. For the same reason, the reaction temperature is kept low, preferably between 10 and 60° C. Chloroacetyl chloride may also be used instead of acetyl chloride.

Preferably at least 1 mol of aluminium chloride is used per 1 mol of diphenyl. Since the aluminium chloride which has not been consumed in the Friedel-Crafts reaction is needed as a dehydrating agent in the subsequent nitration, an excess of aluminium chloride of about 1 mol is advantageously used.

The second stage, namely the nitration, subsequently takes place in the same reaction medium. Where no excess aluminium chloride is used in the acylation, the addition of aluminium chloride as a dehydrating agent has been found to be necessary. It is appropriate to use at least 0.6 mol, preferably 1 to 1.3 mols, of aluminium chloride per 1 mol of the acetyldiphenyl/aluminium chloride complex. It is also possible to increase the amount of aluminium chloride considerably without, however, increasing the yield. Nitric acid of at least 94% concentration is appropriately used, and the process advantageously carried out at temperatures of from 10° to 90° C. Under these conditions the nitration is complete in a short time.

The total amount of nitrobenzene in the reactions mentioned is preferably such that it ensures a separation into two layers in the subsequent decomposition of the complex with water, with the nitroacetyldiphenyl being in the nitrobenzene phase.

The ntiroacetyldiphenyl may, for example, be isolated by evaporating off the nitrobenzene or by precipitation with methanol, and may then be converted into nitrodiphenyl carboxylic acid by means of oxidation, for example, with nitric acid or by treatment with an alkali hypochlorite.

However, it proves advantageous to dispense with isolation of the nitroacetyldiphenyl and to allow the alkali hypochlorite to act on the nitrobenzene solution of the nitroacetyldiphenyl. For this purpose, the nitrobenzene solution containing the nitroacetyldiphenyl is washed until neutral, and then mixed with an alkali hypochlorite solution to which an alkali, for example, an alkali hydroxide or alkali carbonate may still be added in order to stabilise it. The addition of an alkali is particularly advisable if the solution of the nitroacetyldiphenyl is still somewhat acid. It is appropriate to combine the treatment with the alkali hypochlorite solution with a steam distillation to remove the nitrobenzene, with the total amount of alkali hypochlorite required being added right from the beginning. The slightly soluble alkali salt of the 4'-nitrodiphenyl-4-carboxylic acid separates out from the residual aqueous solution on cooling, and may easily be isolated by filtration. Since the alkali salts of 2'-nitrodiphenyl-4-carboxylic acid, particularly the sodium salt, are more easily soluble in water than is the sodium salt of 4'-nitrodiphenyl-4-carboxylic acid, separation of the isomers is easily possible. If the final volume after steam distillation is large, the separation of the two carboxylic acids can be rendered more selective by increasing the alkali ion concentration.

The 4'-nitrodiphenyl-4-carboxylic acid is obtained in a pure form by acidifying the alkali salt. However, it is generally not necessary to isolate the free acid since it is possible to start with the alkali salt of 4'-nitrodiphenyl carboxylic acid in preparing the azodiphenyldicarboxylic acid.

Thus it is possible with the new method, in contrast to the known method, to carry out the different stages in the same reaction medium, thereby avoiding the isolation of intermediate products which leads to high losses, and thus achieving a considerably high total yield.

The following examples illustrate the invention. Unless otherwise stated, the parts and percentages are by weight and the temperatures are in degrees centigrade.

EXAMPLE 1

48.6 parts of aluminium chloride are introduced at 25° to 30°, with stirring, into 133 parts by volume of dry nitrobenzene. 52.5 parts of diphenyl are added to the clear solution, and these are also dissolved, with the temperature being allowed to drop to approximately 15°. A solution of 27.7 parts of acetyl chloride and 52.5 parts by volume of nitrobenzene is now added dropwise to the dark orange-yellow mixture at 15° to 17°, over the course of approximately one hour, the mixture is then allowed to rise to 33° over the course of about one hour, and this temperature is maintained for 2 hours. 42.4 parts of aluminium chloride are again added, the nitrating solution of 23.8 parts of 99.3% nitric acid and 70 parts by volume of dry nitrobenzene are added to the solution at 45° to 50° over the course of 30 minutes, and the mixture stirred for a further 2 hours. The solution is then thoroughly stirred into 1200 parts of water and 30 parts by volume of concentrated hydrochloric acid. The mixture is allowed to separate into two layers and the upper layer is drawn off. The nitrobenzene solution is washed with warm water in a similar manner until practically neutral, is then mixed with 150 parts of water, 76 parts by volume of 30% sodium hydroxide solution or the equivalent amount of sodium carbonate solution and 600 parts by volume of sodium hypochlorite solution (active chlorine content of 13 to 14%), and submitted to steam distillation with stirring until, after approximately 1½ hours, the nitrobenzene has been completely distilled off and the residual aqueous solution amounts to about 1900 to 2100 parts by volume. The aqueous solution is adjusted to a volume of 2100 parts by volume at 100°, and small amounts of impurities are filtered off. On cooling, the sodium salt of 4'-nitrodiphenyl-4-carboxylic acid separates out in an amount corresponding to 49.6 parts of free carboxylic acid. Yield is 60% of the theoretical value.

The 4'-nitro-diphenyl-4-carboxylic acid obtained therefrom by acidification with dilute hydrochloric acid melts at 334° to 336° (corrected) and is practically pure.

If in this example 44 parts of chloroacetyl chloride are used instead of acetyl chloride, and nitration is carried out with 27.4 parts of nitric acid, then one obtains the sodium salt of 4'-nitro-diphenyl-4-carboxylic acid in a yield of 50% of the theoretical value, calculated relative to diphenyl.

EXAMPLE 2

97.4 parts of aluminium chloride are introduced into 133 parts by volume of nitrobenzene with stirring and cooling in such a way that a temperature of 40° is not significantly exceeded. The mixture is stirred for approximately 30 minutes in order for the solution to be saturated with aluminium chloride, and is then cooled to 25° and 52.5 parts of diphenyl are introduced into the mixture. During the solution process the temperature rapidly falls to approximately 15°. A solution of 29.4 parts of acetyl chloride in 52.5 parts by volume of nitrobenzene is now allowed to run in dropwise at 15 to 17° over the course of one hour, the temperature of the yellow solution produced in the course of this is allowed to rise to 30°-35° over the course of one hour, and the mixture stirred for a further 2 hours. The solution of 27.6 parts of 98.5% nitric acid in 70 parts by volume of nitrobenzene is now added dropwise at the same temperature, over the course of one hour. After 2 hours, the reaction mixture is poured into 1200 parts of water acidified with 30 parts by volume of concentrated hydrochloric acid while thoroughly stirring. The liquid is allowed to separate into two layers and the upper layer is drawn off at 60° to 80°. The nitrobenzene solution is similarly washed with water until practically neutral. It is then mixed with 645 parts by volume of sodium hypochlorite solution (active chlorine content of 13%) and adjusted to a total volume of 1800 parts by means of warm water at 70°. The nitrobenzene is now completely distilled off in steam, with thorough stirring, and it is advantageous to maintain a liquid volume of 1900 to 2100 parts during the distillation. When the distillation is complete the practically clear aqueous solution, which should still contain detectable amounts of hypochlorite, is adjusted to 2100 parts by volume at 100°, and filtered. As the solution cools, the sodium salt of 4'-nitro-diphenyl-4-carboxylic acid crystallises out. This is filtered off at 20° and washed with 150 parts by volume of 10% sodium chloride solution. On stirring with 1500 parts by volume of dilute hypochloric acid, filtering off, washing with very dilute hypochloric acid and drying, the above salt yields 49.8 parts of 4'-nitro-diphenyl-4-carboxylic acid of melting point 335° to 336°, corrected, as a very pure product. The yield, calculated relative to diphenyl, amounts to 60% of the theoretical value.

What is claimed is:

1. A process for the manufacture of 4'-nitro-4-acetyl- or-4-chloroacetyl-diphenyl which comprises acylating diphenyl in the presence of anhydrous aluminum chloride in nitrobenzene by means of acetyl chloride or chloroacetyl chloride, nitrating the aluminium chloride complex obtained in the same reaction medium by means of concentrated nitric acid in the presence of free aluminium chloride, mixing the reaction mixture with water in order to decompose the aluminium chloride complex, whereby two layers are formed, the nitrobenzene layer containing the nitro-acetyl- or nitro-chloroacetyl diphenyl.

2. A process as claimed in claim 1, wherein acetyl chloride is used as the acylating agent.

3. A process as claimed in claim 1, wherein the nitration is carried out in the presence of at least 0.6 mol, of aluminium chloride per mol of the acetyldiphenyl/aluminium chloride complex.

4. A process as claimed in claim 3, wherein the nitration is carried out in the presence of from 1 to 1.3 mols of aluminium chloride per mol of the acetyldiphenyl/aluminium chloride complex.

5. A process as claimed in claim 1, wherein the reaction temperature in the acylation step is between 10 and 60° C.

6. A process as claimed in claim 1, wherein the reaction temperature in the nitration step is between 10 and 90° C.

7. A process as claimed in claim 2, wherein the nitration is carried out in the presence of at least 0.6 mol of aluminium chloride per mol of the acetydiphenyl/aluminium chloride complex.

References Cited

UNITED STATES PATENTS 2,742,499    4/1956    Franklin _____ 260—523

OTHER REFERENCES

Beilstein: Organische Chemie, vol. 5, p. 233 (1922).
Beilstein: Organische Chemie, Zweites Ergangungswerk, vol. 5, p. 172 (1964).
Gore: Chemical Reviews, 55, 229, 246, 249 (1955).
Bassilios et al.: Bull. Soc. Chim. France 21, 72–73.

DANIEL D. HORWITZ, Primary Examiner

U.S. Cl. X.R.

260—523